(12) United States Patent
Shinada et al.

(10) Patent No.: US 6,794,848 B2
(45) Date of Patent: Sep. 21, 2004

(54) VEHICLE

(75) Inventors: Akira Shinada, Tokyo (JP); Katsuhiko Nunokawa, Kanagawa (JP); Hiroaki Okajima, Chiba (JP)

(73) Assignee: Sony Corporation, Tokyo (JP)

( * ) Notice: Subject to any disclaimer, the term of this patent is extended or adjusted under 35 U.S.C. 154(b) by 189 days.

(21) Appl. No.: 10/167,653

(22) Filed: Jun. 13, 2002

(65) Prior Publication Data

US 2003/0030325 A1 Feb. 13, 2003

(30) Foreign Application Priority Data

Jun. 14, 2001 (JP) ..................................... P2001-179996

(51) Int. Cl.[7] ................................................. H02J 7/14
(52) U.S. Cl. ...................... 320/104; 307/10.3; 307/10.6
(58) Field of Search ................................. 320/104, 103, 320/138; 307/9.1, 10.3, 10.7, 10.6

(56) References Cited

U.S. PATENT DOCUMENTS 3,694,729 A * 9/1972 Jones ......................... 307/150
5,162,720 A * 11/1992 Lambert ..................... 320/104
5,767,658 A * 6/1998 Hayes ........................ 320/104

* cited by examiner

*Primary Examiner*—Bao Q. Vu
(74) *Attorney, Agent, or Firm*—Oblon, Spivak, McClelland, Maier & Neustadt, P.C.

(57) ABSTRACT

When a vehicle, for example, a passenger vehicle stops, electric power is supplied to a passenger compartment mechanism and/or an entertainment device from a power supply isolated from the device relating to a vehicle travel system. Electric power consumption is managed to secure the electric power necessary to create a travel start possible state. Further, a key position is provided to supply electric power only to the passenger compartment mechanism and/or the entertainment device. With this arrangement, music and the like can be comfortably enjoyed by stopping the vehicle.

10 Claims, 5 Drawing Sheets

VEHICLE

BACKGROUND OF THE INVENTION

1. Field of the Invention

The present invention relates to a vehicle and can be applied to, for example, a passenger vehicle. The present invention makes it possible to manage electric power consumption so as to secure the electric power necessary to create a travel start possible state by supplying electric power from a power supply isolated from the devices relating to a travel system to a passenger compartment mechanism and/or an entertainment device when the vehicle stops, and further makes it possible to comfortably enjoy music and the like by stopping the vehicle by the provision of a key position at which electric power is supplied only to the passenger compartment mechanism and/or the entertainment device.

2. Description of the Related Art

Conventionally, in vehicles such as passenger vehicles, the electric power obtained from an alternator have been used to charge a battery as well as supplied to respective sections while the vehicles travel, whereas when the vehicles stop, an engine is stared by the electric power stored in the battery and further an entertainment device such as audio equipment is driven by the electric power.

For this purpose, the engine switch of the passenger vehicles is provided with an accessory position at which electric power is supplied to a system such as the audio equipment, power windows, and the like other than a travel system, a position at which an engine is being rotated, a start position at which the engine is started, and the like in this sequence from a position at which a key is inserted and extracted. In the passenger vehicles, a system to which electric power is supplied can be switched by selecting a desired position from the above positions by manipulating the key.

Incidentally, while the known passenger vehicles stop, the audio equipment and the like are driven using the electric power of the battery that is used to start the engine as described above. Thus, the electric power of the battery is greatly consumed by being used a long time, which makes it impossible to start the engine eventually. When it is intended to prevent this disadvantage in the known passenger vehicles, a problem is arisen in that music and the like cannot be comfortably enjoyed by stopping the vehicles.

The method disclosed in, for example, Japanese Unexamined Patent Application Publication No. 9-275635 as a method of solving the above problem proposes a method of supplying electric power for starting an engine from a main battery and supplying electric power to audio equipment and the like from an auxiliary battery provided separately.

In this method, the engine can be started by the main battery, even if the auxiliary battery has been consumed. However, it is difficult to supply electric power to a device such as an air conditioner that consumes a large amount of electric power for a sufficient period of time, thereby a problem arises in that music and the like cannot be comfortably enjoyed eventually by stopping a vehicle.

SUMMARY OF THE INVENTION

An object of the present invention, which was made in view of the above problems, is to propose a vehicle that permits to comfortably enjoy music and the like by stopping the vehicle.

To solve the above problem, in a first aspect of the present invention applied to a vehicle, the vehicle is composed of a passenger compartment mechanism for cooling and/or heating a passenger compartment, and a power supply isolated from the devices relating to a travel system for supplying electric power to the passenger compartment mechanism when the vehicle stops.

In a second aspect of the present invention applied to a vehicle, the vehicle is composed of a power supply isolated from the devices relating to a travel system for supplying electric power to an entertainment device for providing entertainment in a passenger compartment when the vehicle stops.

In a seventh aspect of the present invention applied to a vehicle, the vehicle is composed of an electric power management means for managing the electric power consumed in a battery such that the electric power stored in the battery does not become equal to or less than the electric power necessary to create the travel start possible state when the vehicle stops.

Further, in a tenth aspect of the present invention applied to a vehicle in which subjects to which electric power is supplied are changed according to a key position of a key manipulated by being turned, the vehicle has a key position at which electric power is supplied only to a passenger compartment mechanism for cooling and/or heating a passenger compartment and/or to an entertainment device for providing entertainment in the passenger compartment.

According to the arrangement of the first aspect, the power supply isolated from the devices relating to the vehicle travel system is provided to supply electric power to the passenger compartment mechanism when the vehicle stops. Thus, even if the power supply has been exhausted, no influence is exerted on the vehicle travel system at all. With this arrangement, it is possible to enjoy music and the like by creating a comfortable environment without concern for electric power consumption.

In the second aspect of the present invention applied to the vehicle, the power supply isolated from the devices relating to the vehicle travel system is provided to supply electric power to the entertainment device for providing entertainment in the passenger compartment when the vehicle stops. Thus, even if the power supply has been exhausted, no influence is exerted on the vehicle travel system at all. With this arrangement, it is possible to comfortably enjoy music and the like without concern for electric power consumption.

In the seventh aspect of the present invention applied to the vehicle, music and the like can be comfortably enjoyed without concern with the amount of electric power remaining in the battery by providing the electric power management means for managing the consumption of electric power of the battery such that the electric power stored in the battery does not become equal to or less than the electric power necessary to create the travel start possible state when the vehicle stops.

Further, in the tenth aspect of the present invention applied to the vehicle in which the subjects to which electric power is supplied are changed according to a key position of the key manipulated by being turned, a key position can be selected by manipulating the key similarly to a conventional manner by providing the key position at which electric power is supplied only to the passenger compartment mechanism for cooling and/or heating the passenger compartment and/or to the entertainment device for providing entertainment in the passenger compartment. With this arrangement, music and the like can be comfortably enjoyed more user-friendly.

DESCRIPTION OF THE PREFERRED EMBODIMENTS

Embodiments of the present invention will be described below in detail by appropriately referring to the drawings.

(1) First Embodiment (1-1) Arrangement of First Embodiment

Figure 1:
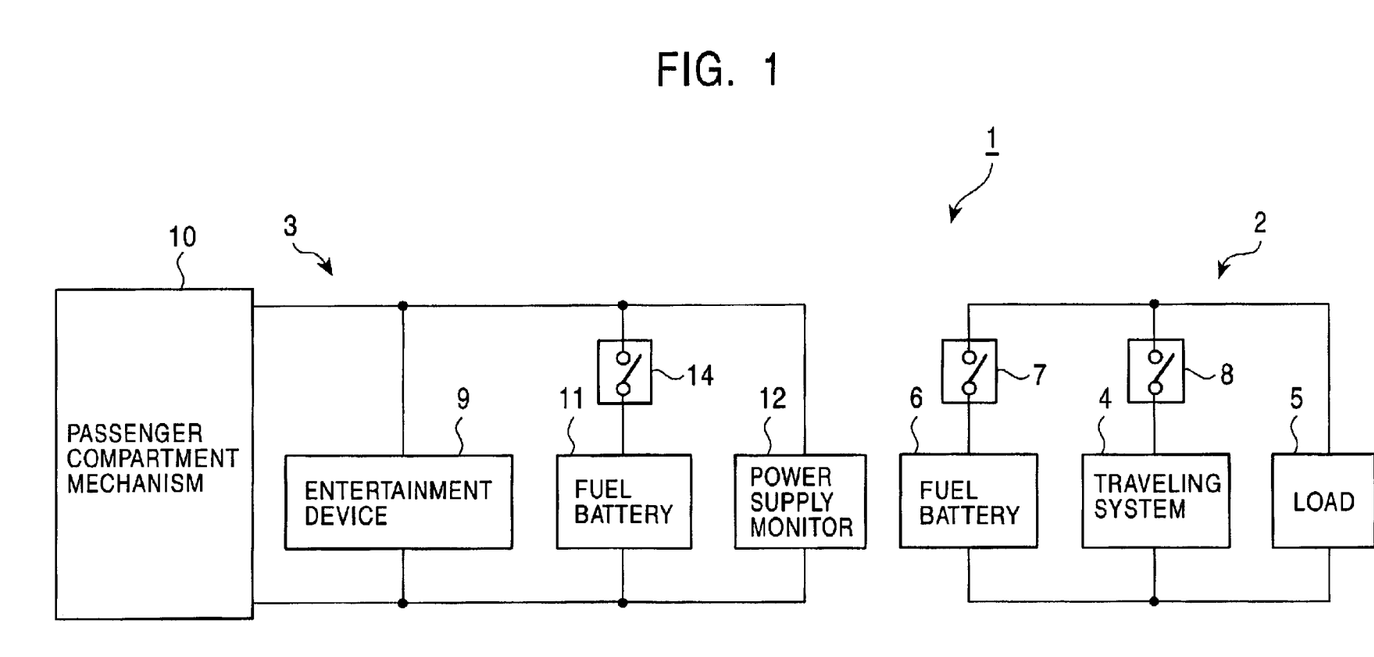
FIG. 1 is a block diagram showing a power supply system of a passenger vehicle according to a first embodiment of the present invention.

FIG. 1 is a block diagram showing a power supply system of a passenger vehicle according to a first embodiment of the present invention. The passenger vehicle 1 is an electric vehicle driven by a fuel battery and includes an power supply system composed of two power supply subsystems, that is, a power supply subsystem 2 relating to a vehicle travel system and a power supply subsystem 3 relating to entertainment.

The power supply subsystem 2 relating to the vehicle travel system supplies electric power from a fuel battery 6 to a travel system 4 for traveling the passenger vehicle 1 and to a load 5 necessary to travel the vehicle such as head lights, and the electric power supplied from the fuel battery 6 is controlled by switch circuits 7 and 8.

In contrast, the power supply subsystem 3 relating to entertainment is an independent power supply subsystem isolated from the power supply subsystem 2 relating to the vehicle travel system and supplies electric power from a dedicated fuel battery 11 to an entertainment device 9 and a passenger compartment mechanism 10. The power supply subsystem 3 can monitor the operating state of the fuel battery 11 through a power supply monitor 12 disposed in a dashboard of the passenger vehicle. The entertainment device 9 is a generic term of devices for providing passengers with various types of entertainment and includes, for example, various types of audio equipment, video equipment, a personal computer, a personal digital assistant (PDA), a phone, and the like.

With this arrangement, in the passenger vehicle 1, electric power is supplied from the fuel battery 11 provided separately from the power supply 6 for driving the vehicle to the entertainment device 9 for providing the aforementioned entertainment and to the passenger compartment mechanism 10 for managing an environment in which the entertainment is provided, which permits to enjoy the entertainment without exerting any influence on the fuel battery 6 relating to the drive of the vehicle. Accordingly, music and the like can be comfortably enjoyed by stopping the vehicle.

The power supply subsystem 3 relating to the entertainment supplies electric power through a switch circuit 14. In the passenger vehicle 1, the switch circuits 7, 8, and 14 can be manipulated by an engine switch similar to that of known passenger vehicles.

Figure 2:
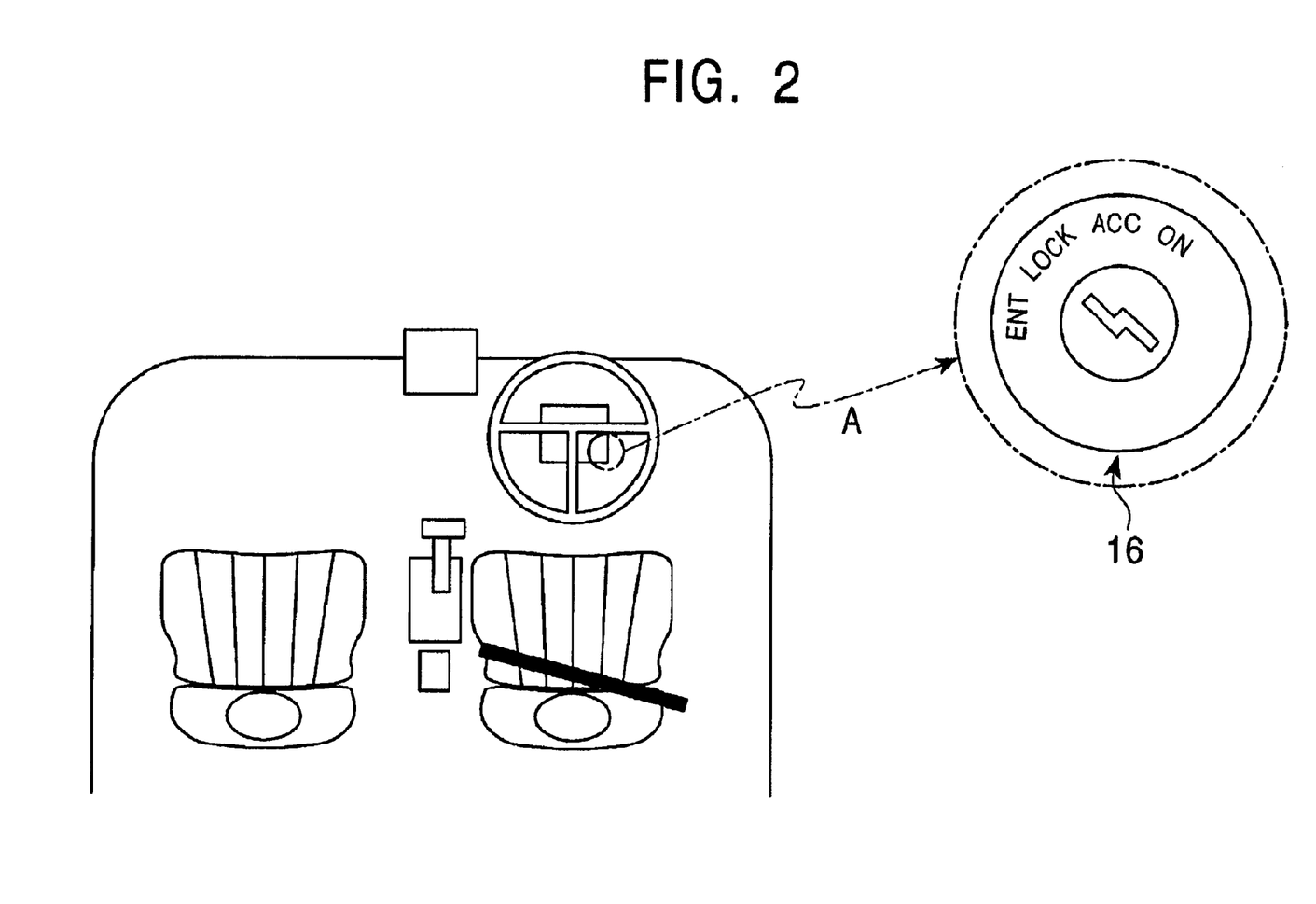
FIG. 2 is a plan view showing a passenger compartment of the passenger vehicle shown in FIG. 1.

FIG. 2 is a plan view showing a front passenger compartment of the passenger vehicle 1. In the passenger vehicle 1, the engine switch 16 is disposed at the root portion of a steering wheel and is shown in an enlarged fashion as indicated by an arrow A. The engine switch 16 has an accessory position (ACC) and an ON position (ON) set thereto in this sequence for a clockwise key manipulation from a key insert/extract position (LOCK). Further, the engine switch 16 has an entertainment position (ENT) set thereto to manipulate a key counterclockwise from the key insert/extract position (LOCK).

In the passenger vehicle 1 shown in FIG. 1, the fuel batteries 6 and 11 are put into an operable state by inserting the key into the engine switch 16. Further, the switch circuits 7 and 14 are turned on by manipulating the key to the accessory position (ACC), thereby the electric power of the fuel battery 6 is supplied to the load 5 as well as the electric power of the fuel battery 11 is supplied to the entertainment device 9 and the passenger compartment mechanism 10. Further, the switch circuit 8 is turned on by manipulating the key to the ON position (ON), in addition to these switch circuits 7 and 14, thereby the electric power of the fuel battery 6 is supplied to the travel system 4.

In contrast, manipulation of the key to the entertainment position (ENT) turns on only the switch circuit 14, thereby the electric power of the fuel battery 11 is supplied to the entertainment device 9 and the passenger compartment mechanism 10.

(1-2) Operation of the First Embodiment

With the above arrangement, in the passenger vehicle 1, the fuel batteries 6 and 11 are put into the operable state by inserting the key into the engine switch 16. Next, the electric power of the fuel battery 6 for the travel system is supplied to the load 5 by selecting the accessory position by turning the key clockwise. The head lights and the like are turned on by the electric power supplied as described above. Further, the electric power of the fuel battery 11 for the entertainment is supplied to the entertainment device 9 and the passenger compartment mechanism 10, which permits to enjoy music and the like in a comfortable environment by operating them.

In the passenger vehicle 1, the electric power of the fuel battery 6 for the travel system is supplied to the travel system 4 by selecting the ON position by further turning the key clockwise, thereby it is possible to start the passenger vehicle 1.

In contrast, the electric power supplied from the fuel battery 6 for the travel system is interrupted by selecting the entertainment position by turning the key counterclockwise from the lock position, thereby only the electric power of the fuel battery 11 for the entertainment is supplied to the entertainment device 9 and the passenger compartment mechanism 10.

With this arrangement, in the passenger vehicle 1, it is possible to create the comfortable environment by the passenger compartment mechanism 10 and to enjoy music and the like by entertainment device 9 making use of the electric power of the fuel battery 6. In the passenger vehicle 1, it is possible to enjoy music and the like without concern for the remaining amount of electric power stored in the battery for the travel system, that is, simply in consideration of fuel consumption without taking electric power consumption into consideration. This is because, in this state, the entertainment device 9 and the passenger compartment mechanism 10 are operated by the electric power of the fuel battery 11 isolated from the devices relating to the travel system. With this arrangement, music and the like can be comfortably enjoyed by stopping the vehicle in this embodiment.

Further, the entertainment position set to the engine switch permits a user to operate the switch by manipulating the key similarly to a conventional manner without concern for that the fuel battery 11 for the entertainment is arranged as a separate power supply system, thereby music and the like can be comfortably enjoyed more user-friendly.

(1-3) Effect of the First Embodiment

According to the above arrangement, music and the like can be comfortably enjoyed when the vehicle stops by supplying electric power to the passenger compartment mechanism and the entertainment device from the power supply isolated from the devices relating to the travel system.

Further, the provision of the key position for supplying electric power only to the passenger compartment mechanism and the entertainment device makes it possible to comfortably enjoy music and the like by stopping the vehicle.

(2) Second Embodiment

Figure 3:
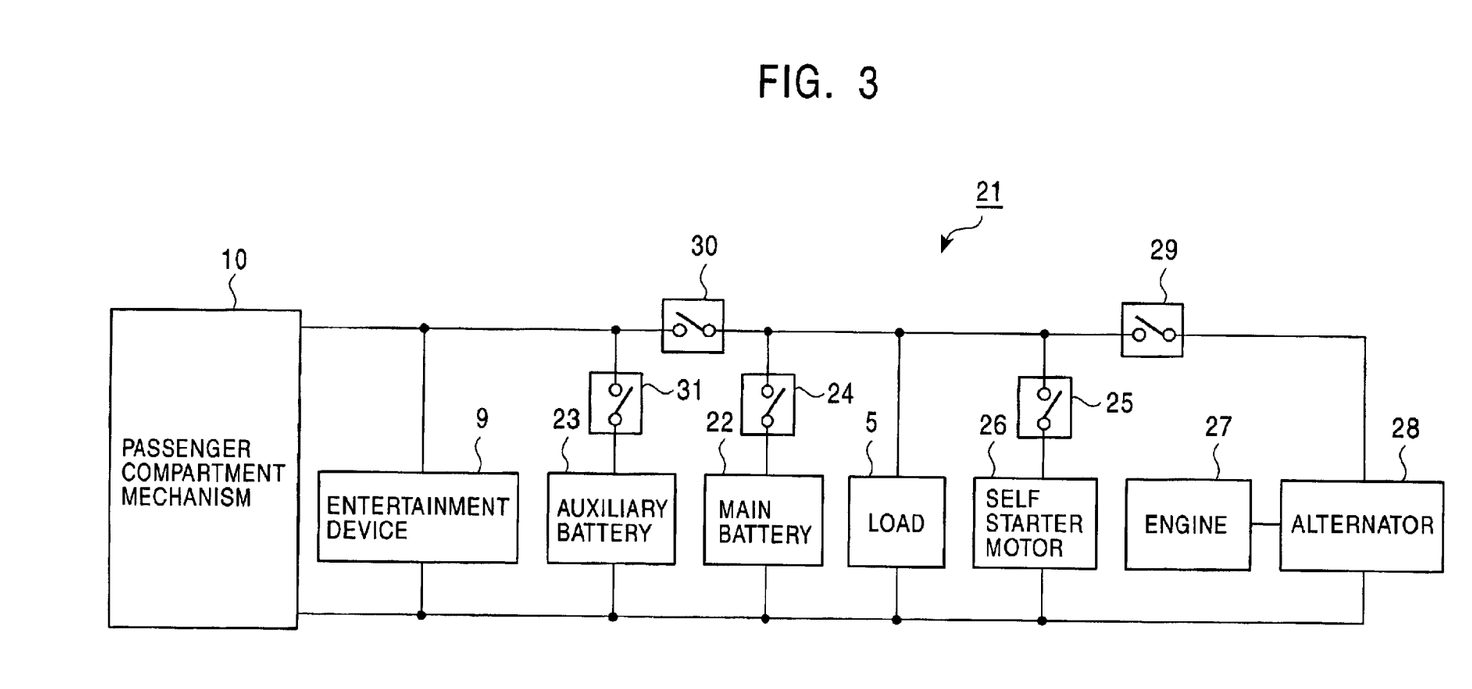
FIG. 3 is a block diagram showing a power supply system of a passenger vehicle according to a second embodiment of the present invention.

FIG. 3 is a block diagram showing a power supply system of a passenger vehicle according to a second embodiment of the present invention.

In the passenger vehicle 21, electric power is supplied to respective sections by a main battery 22 and an auxiliary battery 23.

That is, the main battery 22 is a power supply relating to the travel system and supplies electric power to the load 5 such as the head lights and the like through a switch circuit 24. Further, the main battery 22 supplies electric power to a self starter motor 26 through a switch circuit 25 to thereby start an engine 27 by driving the self starter motor 26. Furthermore, the main battery 22 is charged by the electric power of an alternator 28 that generates it when the engine 27 is started via the switch circuit 29.

The auxiliary battery 23 is charged by the electric power of the alternator 28 through switch circuits 29, 30, and 31 and further can supply electric power to the entertainment device 9 and the passenger compartment mechanism 10 through the switch circuit 31.

Figure 4:
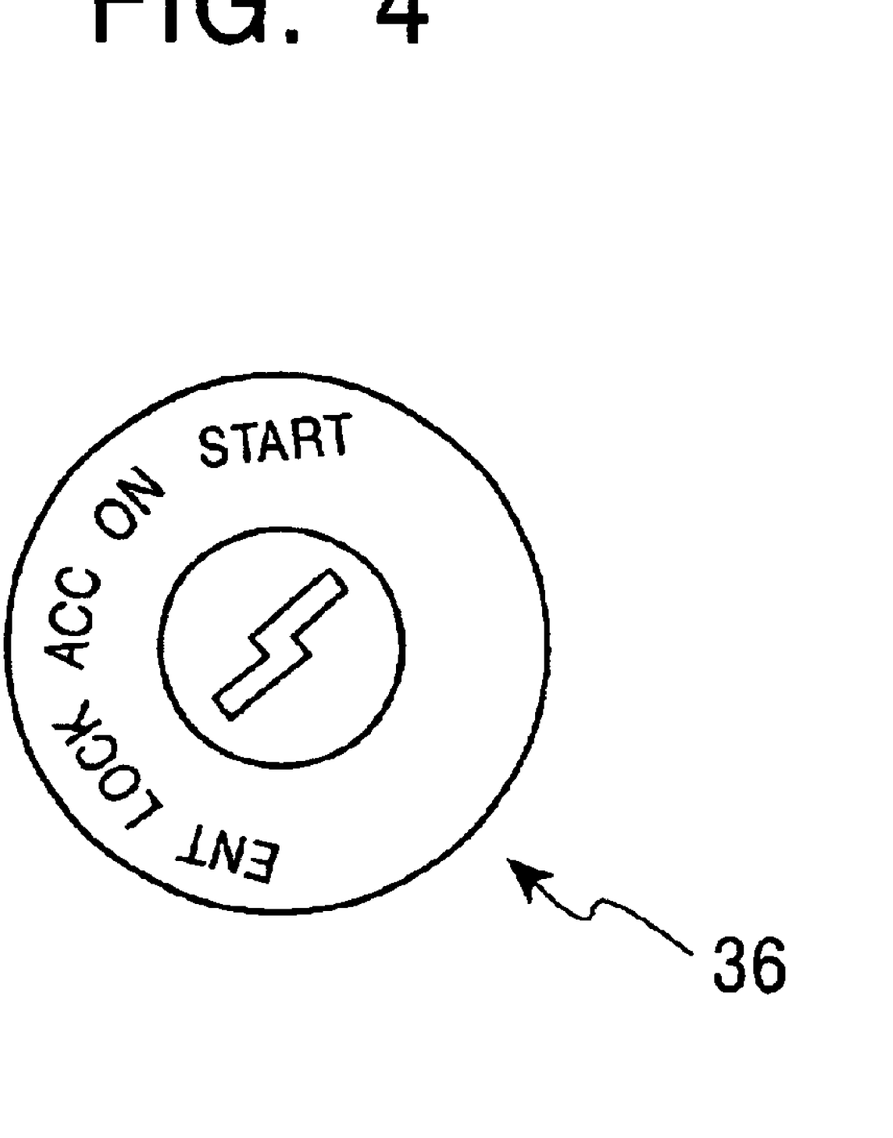
FIG. 4 is a plan view showing an engine switch of the passenger vehicle shown in FIG. 2.

In the passenger vehicle 21, a start position is set at a position to which the key is further manipulated clockwise from an ON position as in a switch 36 shown in FIG. 4 in contrast with FIG. 1. In the switch 36, the key is manipulated to the start position, and when the key is released next, it returns to the ON position as a former position.

In the passenger vehicle 21, when the key is inserted into the lock position and manipulated to the accessory position, the switch circuit 24 is turned on, and the electric power of the main battery 22 is supplied to the load. At the same time, the electric power of the auxiliary battery 23 can be supplied to the entertainment device 9 and the passenger compartment mechanism 10 by turning on the switch circuit 31.

When the start position is selected by further manipulating the key, the switch circuit 29 is turned on, and when the start position is selected following to the above operation, the switch circuit 25 can be turned on in this state. With this operation, in the passenger vehicle 21, the key is manipulated up to the start position to thereby start the engine 27. Thereafter, when the key is released, the alternator 28 is driven by the rotation of the engine 27, and the main battery 22 is charged by the electric power generated by the alternator 28.

Further, when the engine 27 is started and the alternator 28 starts to supply the electric power generated thereby, the switch circuit 30 is turned on. With this operation, the auxiliary battery 23 is charged by the electric power generated by the alternator 28.

In contrast, when the entertainment position is selected by manipulating the key counterclockwise, only the switch circuit 31 is turned on in the passenger vehicle 21 and the other switch circuits 24, 25, 29, and 30 are turned off.

With this operation, the passenger vehicle 21 is stopped by interrupting the engine 27 at the entertainment position, and electric power is supplied from the auxiliary battery 23 acting as the power supply isolated from the devices relating to the travel system to the entertainment device 9 and the passenger compartment mechanism 10 in the state in which the passenger vehicle 21 stops.

According to the arrangement shown in FIG. 3, music and the like can be comfortably enjoyed by stopping the vehicle even if electric power is supplied to the passenger compartment mechanism and the entertainment device 9 and the passenger compartment mechanism 10 from the auxiliary battery 23 acting as the power supply isolated from the devices relating to the travel system when the vehicle stops.

Further, even if the engine is started at the start position as described above, music and the like can be comfortably enjoyed as user-friendly as ever by the provision of the key position at which electric power is supplied only to the passenger compartment mechanism and the entertainment device.

(3) Third Embodiment

In a third embodiment, when electric power is not sufficiently supplied to the devices relating to the travel system due to a malfunction and the like in the first a second embodiments described above, electric power is supplied to the devices relating to the travel system from the fuel battery 11 acting as the power supply relating to the entertainment or from the auxiliary battery 23.

That is, in the third embodiment, the voltage of the power supply relating to the devices relating to the travel system is monitored by a predetermined control circuit. When the voltage of the power supply relating to the devices that relate to the travel system drops to a voltage equal to or less than a predetermined voltage, electric power is supplied to the devices relating to the travel system from the fuel battery 11 or the auxiliary battery 23.

In the third embodiment, when electric power is supplied insufficiently, it is possible to effectively cope with various abnormal states and the like by supplying the electric power of the power supply for the entertainment to the devices relating to the travel system by effectively making use of the feature of the present invention that the power supplies are composed of the two systems, thereby the reliability of the power supply system can be improved.

(4) Fourth Embodiment

In a fourth embodiment, the present invention is applied to a passenger vehicle in which a travel start possible state is set by the electric power charged in a battery as well as the battery is charged by the electric power obtained while the passenger vehicle travels. The term "travel start possible state" means the state in which an engine is started in a passenger vehicle employing a gasoline engine and in a passenger vehicle employing a diesel engine and the state in which electric power can be supplied from a fuel battery by starting the operation of, for example, a reformer in a passenger vehicle traveled by the fuel battery.

In a vehicle according to the fourth embodiment, the amount of electric power remaining in the battery is monitored based on the terminal voltage thereof by a predetermined electric power management means, and electric power is supplied to the entertainment device and the passenger compartment mechanism within a range in which the amount of electric power remaining in the battery does not become equal to or less than the electric power necessary to create the travel start possible state.

That is, when the amount of electric power remaining in the battery approaches the electric power necessary to create the travel start possible state, the electric power being supplied to the entertainment device and the passenger compartment mechanism from the battery is stopped by the electric power management means. Further, after the engine and the fuel battery have been started, the battery is charged by a charge mechanism composed of the engine and the fuel battery, and the electric power generated by the engine and the fuel battery is supplied to the entertainment device and the passenger compartment mechanism.

With this arrangement, in the fourth embodiment, the electric power consumed in the battery is managed by the electric power management means such that the electric power stored in the battery does not become equal to or less than the electric power necessary to create the travel start possible state when the vehicle stops.

It is possible to comfortably enjoy music and the like similarly to the first embodiment even if the electric power consumed in the battery is managed by the electric power management means such that the electric power stored in the battery does not become equal to or less than the electric power necessary to create the travel start possible state when the vehicle stops as in the fourth embodiment.

Further, when the amount of electric power stored in the battery approaches approximately the electric power necessary to create the travel start possible state, the battery is charged by starting the operation of the charge means for charging the battery. Thus, even if the battery is shared by the travel system as described above, music and the like can be enjoyed without almost any restriction.

(5) Fifth Embodiment

In a fifth embodiment, the amount of electric power remaining in the battery is monitored based on the terminal voltage thereof by the predetermined electric power management means, similarly to the arrangement according to the fourth embodiment, and electric power is supplied to the entertainment device and the passenger compartment mechanism within a range in which the amount of electric power remaining in the battery does not become equal to or less than the electric power necessary to create the travel start possible state.

That is, when the amount of electric power remaining in the battery approaches the electric power necessary to create the travel start possible state, the electric power management means stops the electric power being supplied to the entertainment device and the passenger compartment mechanism by the battery. Further, the electric power management means calculates the period of time from the time at which the electric power begins to be supplied to the entertainment device and the passenger compartment mechanism to the time at which the supply thereof is stopped and displays the period of time on a predetermined display means.

According to the fifth embodiment, it is possible to obtain an effect similarly to that of the fourth embodiment even if the electric power being supplied is simply stopped when the amount of electric power remaining in the battery approaches the electric power necessary to create the travel start possible state.

Further, the degree of consumption of the electric power consumed in the battery can be notified to the user by displaying the period of time until a time at which the electric power stored in the battery becomes approximately the electric power necessary to create the travel start possible state, thereby the vehicle can be used more user-friendly.

(6) Sixth Embodiment

The first to fifth embodiments have been described as to the case in which the power supply subsystem 2 relating to the vehicle travel system is completely isolated from the power supply subsystem 3 relating to the entertainment. However, the present invention is by no means limited thereto, and the power supply subsystem 2 relating to the vehicle travel system may be isolated from the power supply subsystem 3 relating to the entertainment at least only when the vehicle stops.

Figure 5:
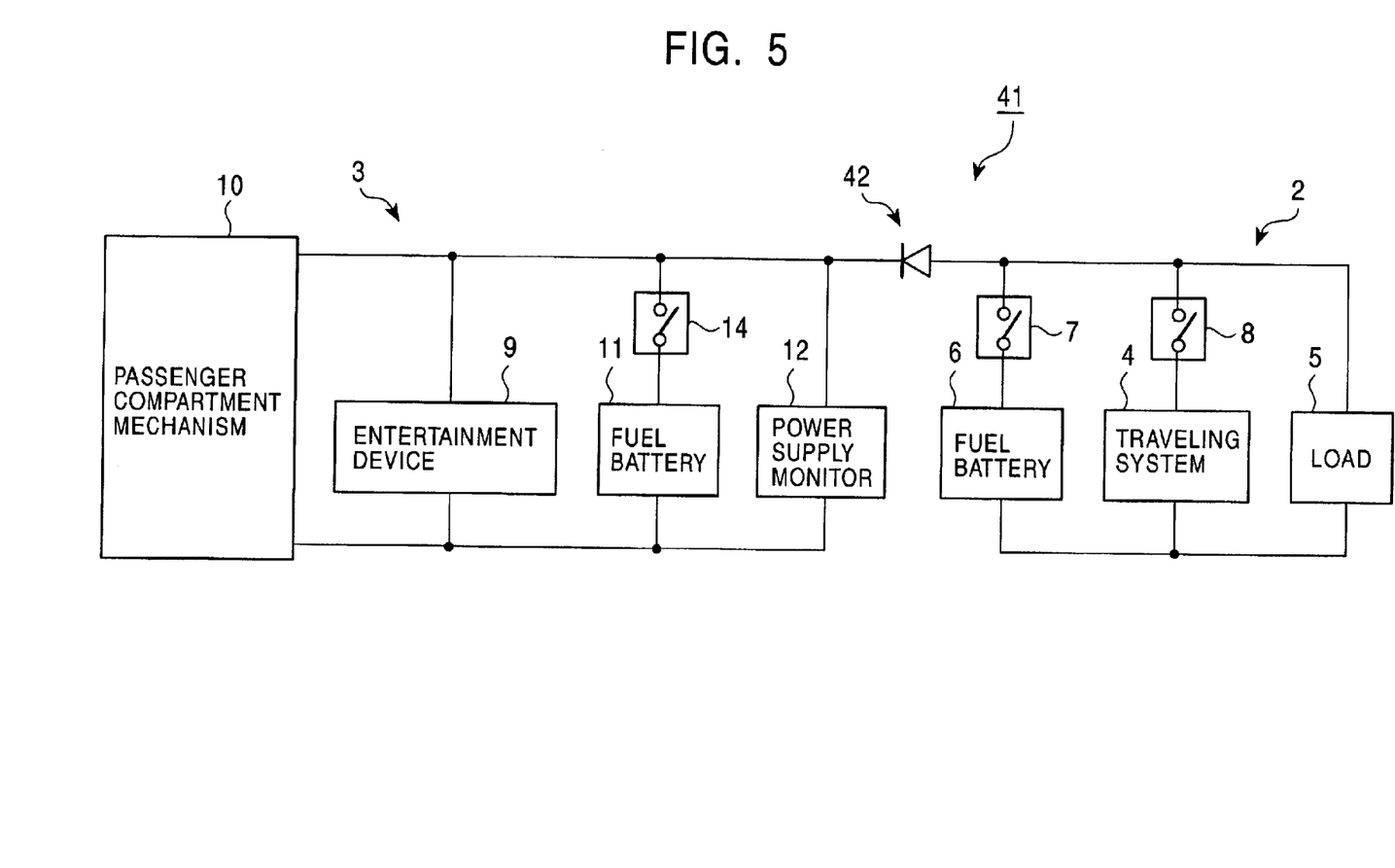
FIG. 5 is a block diagram showing a power supply system of a passenger vehicle according to another embodiment of the present invention.

That is, as shown in FIG. 5 in contrast with FIG. 1, in a passenger vehicle 41 according to a sixth embodiment, the power supply subsystem 2 is connected to the power supply subsystem 3 through a diode 42 to make it possible to supply electric power from the power supply subsystem 2 relating to the power supply subsystem 3 relating to the entertainment and to make it difficult to supply the electric power inversely. Further, when the fuel battery 6 for the vehicle travel system supplies electric power, that is, when the key is set to the accessory position or the on position, the switch circuit 14 is turned off as well as the operation of the fuel battery 11 is stopped, which permits the entertainment device 9 and the passenger compartment mechanism 10 to be operated by the electric power of the fuel battery 6 for the vehicle travel system when the battery 6 supplies the electric power. In contrast, when the passenger vehicle 41 stops, the fuel battery 6 interrupts to supply electric power, and the user selects the entertainment position, the switch circuit 14 is turned on to thereby operate the entertainment device 9 and the passenger compartment mechanism 10 by the electric power of the fuel battery 11.

It is possible to obtain an effect similar to that of the aforementioned embodiments even if the power supply subsystems are isolated from each other during only the period of time in which the vehicle stops and electric power is simply consumed.

While the case in which the electric power being supplied is switched by the engine switch has been described in the aforementioned embodiments, the present invention is by no means limited thereto, and electric power may be supplied exclusively to the devices relating to the entertainment mechanism and to the passenger compartment mechanism by manipulating a dedicated switch.

While the case in which electric power is exclusively supplied to the entertainment device and the passenger compartment mechanism in the above embodiments, the present invention is by no means limited thereto, and electric power may be exclusively supplied to the entertainment device and the passenger compartment mechanism by providing a key position with each of them, or electric power may be exclusively supplied to any of the entertainment device and the passenger compartment mechanism.

While the aforementioned embodiments have described as to the case in which the present invention is applied to the passenger vehicle, the present invention is by no means limited thereto and can be widely applied to various types of vehicles.

As described above, according to the present invention, it is possible to comfortably enjoy music and the like by stopping the vehicle by supplying electric power from the power supply isolated from the devices relating to the vehicle travel system to the passenger compartment mechanism and/or the entertainment device when the vehicle stops, by managing electric power consumption so as to secure the electric power necessary to create the travel start possible state, and further providing the key position at which electric power is supplied only to the passenger compartment mechanism and/or the entertainment device.

What is claimed is:

1. A vehicle comprising:

a passenger compartment mechanism configured to at least one of heat and cool a passenger compartment;

a power supply isolated from devices relating to a vehicle propulsion system, said power supply configured to supply electric power to the passenger compartment mechanism when the vehicle propulsion system is stopped; and a multi-position switch configured to connect said power supply and another power supply to said vehicle propulsion system when in a first position, and disconnect said power supply from said vehicle propulsion system when in a second position, but not disconnect said power supply to said passenger compartment mechanism when in said second position.

2. A vehicle comprising:

an entertainment device for providing at least one of audio and video entertainment in a passenger compartment; and a power supply isolated from the devices relating to a vehicle propulsion system, said power supply configured to supply electric power to the entertainment device when the vehicle propulsion system is stopped; and a multi-position switch configured to connect said power supply and another power supply to said vehicle propulsion system when in a first position, and disconnect said power supply from said vehicle propulsion system when in a second position, but not disconnect said power supply to said passenger compartment mechanism when in said second position.

3. A vehicle according to claim 1, wherein when electric power is insufficiently supplied from another power source to the devices relating to the vehicle propulsion system, electric power from the power supply is supplied to the devices relating to the vehicle propulsion system.

4. A vehicle according to claim 2, wherein when electric power is insufficiently supplied from another power source to the devices relating to the vehicle propulsion system, the electric power from the power supply is supplied to the devices relating to the vehicle propulsion system.

5. A vehicle according to claim 1, wherein the power supply is a fuel battery.

6. A vehicle according to claim 2, wherein the power supply is a fuel battery.

7. A vehicle comprising:

a battery for providing electricity to a vehicle propulsion system creating a travel start possible state by the electric power charged therein;

an alternator for charging the battery by generating electricity while the vehicle travels; and electric power management means for managing electric power consumed in the battery such that the electric power stored in the battery does not become equal to or less than an amount of electric power necessary to create the travel start possible state when the vehicle propulsion system is stopped; and a multi-position switch configured to connect said power supply and another power supply to said vehicle propulsion system when in a first position, and disconnect said power supply from said vehicle propulsion system when in a second position, but not disconnect said power supply to said passenger compartment mechanism.

8. A vehicle according to claim 7, wherein the electric power management means displays a time estimated for remaining electric power stored in the battery to become approximately the electric power necessary to create the travel start possible state through predetermined display means.

9. A vehicle according to claim 7, wherein when the electric power stored in the battery approaches approximately the electric power necessary to create the travel start possible state, the battery is charged by starting the operation of charge means for charging the battery.

10. A vehicle comprising:

a passenger compartment mechanism configured to at least one of cool and heat a passenger compartment;

an entertainment device for providing at least one of audio and video entertainment in the passenger compartment; and an engine switch for switching between different combinations of electrical circuits including a vehicle propulsion system to which electric power is supplied according to a position of a key manipulated by being turned, wherein the engine switch has a first key position at which electric power is supplied only to at least one of the passenger compartment mechanism and the entertainment device.

* * * * *